(12) United States Patent
Suzuki

(10) Patent No.: US 12,422,076 B2
(45) Date of Patent: Sep. 23, 2025

(54) PIPE JOINT ASSEMBLY

(71) Applicant: NITTO KOHKI CO., LTD., Tokyo (JP)

(72) Inventor: Masahide Suzuki, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 0 days.

(21) Appl. No.: 18/640,879

(22) Filed: Apr. 19, 2024

(65) Prior Publication Data
US 2024/0263728 A1 Aug. 8, 2024

Related U.S. Application Data

(63) Continuation of application No. PCT/JP2022/037577, filed on Oct. 7, 2022.

(30) Foreign Application Priority Data

Oct. 28, 2021 (JP) ................................. 2021-176938

(51) Int. Cl.
*F16L 37/252* (2006.01)
(52) U.S. Cl.
CPC .................................. *F16L 37/252* (2013.01)
(58) Field of Classification Search
CPC ..... F16L 37/252; F16L 37/113; F16L 37/105; F16L 37/107
(Continued)

(56) References Cited

U.S. PATENT DOCUMENTS

| | | | | |
|---|---|---|---|---|
| 767,843 A | * | 8/1904 | Smith | F16L 37/252 285/361 |
| 941,990 A | * | 11/1909 | Hickey | F16L 37/252 285/361 |

(Continued)

FOREIGN PATENT DOCUMENTS

| | | |
|---|---|---|
| CN | 213018261 | 4/2021 |
| CN | 213929886 | 8/2021 |

(Continued)

OTHER PUBLICATIONS

International Search Report issued in corresponding International Application PCT/JP2022/037577, mailed Dec. 27, 2022.

*Primary Examiner* — David Bochna
(74) *Attorney, Agent, or Firm* — Burris Law, PLLC

(57) ABSTRACT

A pipe assembly includes male and female joints. The female joint includes a rotary coupling member rotatable around an outer peripheral surface of a female joint body, and a locking member pivotable relative to the rotary coupling member. The rotary coupling member has a surface facing a rear end portion thereof. A male joint body is configured to be inserted into the rotary coupling member such that rotation of the rotary coupling member to a coupling position causes a projection to engage the surface, and the male and female joint bodies to be sealingly engaged in a coupled state. The locking member is configured to be pivoted to a lock position in the coupled state wherein the locking member interferes with the projection, thus inhibiting the rotary coupling member from rotating from the coupling position to an uncoupling position where the surface is out of engagement with the projection.

6 Claims, 12 Drawing Sheets

(58) Field of Classification Search
USPC .................................................. 285/87, 88
See application file for complete search history.

(56) References Cited

U.S. PATENT DOCUMENTS

| | | | | | |
|---|---|---|---|---|---|
| 966,925 | A | * | 8/1910 | Kittredge | F16L 37/252 285/361 |
| 981,866 | A | * | 1/1911 | Lockhart | F16L 37/252 285/361 |
| 1,121,147 | A | * | 12/1914 | Stiglich | F16L 37/252 285/361 |
| 1,233,750 | A | * | 7/1917 | Butcher | F16L 37/252 403/339 |
| 1,525,794 | A | * | 2/1925 | Blake | F16L 37/252 285/8 |
| 2,147,026 | A | * | 2/1939 | Glab | F16L 37/252 285/379 |
| 2,324,792 | A | * | 7/1943 | Meyer | F16L 37/252 285/332 |
| 2,647,768 | A | * | 8/1953 | Exton | F16L 37/252 285/376 |
| 3,632,142 | A | * | 1/1972 | Ichihara | F16L 37/113 285/88 |
| 4,184,516 | A | * | 1/1980 | Oesterritter | F16L 55/1155 138/96 R |
| 8,201,853 | B2 | * | 6/2012 | Tiberghien | F16L 37/34 285/376 |

FOREIGN PATENT DOCUMENTS

| | | |
|---|---|---|
| CN | 214146981 | 9/2021 |
| JP | S51021230 | 2/1976 |
| JP | S64035196 | 2/1989 |
| JP | 2004044619 | 2/2004 |
| JP | 2009092170 | 4/2009 |
| JP | 2018013185 | 1/2018 |

\* cited by examiner

PIPE JOINT ASSEMBLY

CROSS-REFERENCE TO RELATED APPLICATIONS

This application is a continuation of International Application No. PCT/JP2022/037577, filed on Oct. 7, 2022, which claims priority to and the benefit of Japanese Patent Application No. 2021-176938, filed on Oct. 28, 2021. The disclosures of the above applications are incorporated herein by reference in their entireties.

FIELD

The present disclosure relates to a pipe joint assembly including a male pipe joint and a female pipe joint which are detachably coupled to each other. More particularly, the present disclosure relates to a pipe joint assembly having a female pipe joint including a joint body and a rotary coupling member rotatably disposed around the joint body, in which, with a male pipe joint at least partially inserted into the female pipe joint, the rotary coupling member is rotated to engage with an engaging projection of the male pipe joint, thereby maintaining the coupled state of the male and female pipe joints.

BACKGROUND

In the above-described pipe joint assembly, the rotary coupling member of the female pipe joint has a cut portion formed therein to extend circumferentially, and the rotary coupling member is configured to be rotated so that the engaging projection of the male pipe joint passes along the cut portion, thereby permitting the engaging projection to engage a side face of the cut portion and thus keeping the male pipe joint coupled to the female pipe joint. In many cases, the side face of the cut portion is provided with a recess so that the engaging projection is fitted in the recess, with a view to inhibiting the male pipe joint from being undesirably released from the hold by the female pipe joint, which would otherwise occur when the rotary coupling member unexpectedly rotates reversely in the coupled state.

However, if the engaging projection is merely slightly fitted in the recess, there is a chance that the engagement between the engaging projection and the recess may be unintentionally released when a relatively large force is applied to the rotary coupling member in the direction of rotation, resulting in the rotary coupling member rotating undesirably. Alternatively, if the recess is deepened so that the whole engaging projection is received in the recess, for example, the possibility is reduced that the engagement between the engaging projection and the recess may be unintentionally released. In order to engage the engaging projection with the recess, however, it is typically necessary to first push the male pipe joint into the female pipe joint longitudinally to a considerable extent and then pull back the male pipe joint by an amount corresponding to the depth of the recess so that the engaging projection is fitted in the recess. Consequently, in the case where the area between the outer peripheral surface of the male pipe joint and the inner peripheral surface of the female pipe joint is sealed through a seal member such as an O-ring made of an elastic member, the male pipe joint needs to be displaced to a great extent against the sliding friction resistance between the male pipe joint and the seal member. Alternatively, in the case where the respective end faces of the male and female pipe joints are sealed together through a seal member, the seal member is temporarily compressed to a considerable extent. In either case, a large force is needed to couple together the male and female pipe joints, and a heavy load is applied to the seal member, so that the degradation of the seal member may be accelerated.

The present disclosure addresses these and other issues associated with typical pipe joint assemblies.

SUMMARY

The present disclosure provides a pipe joint assembly capable of even more reliably inhibiting accidental rotation of the rotary coupling member in the coupled state without the need to provide the rotary coupling member with a large recess for fitting the engaging projection.

In one form, the present disclosure provides a pipe joint assembly comprising a male pipe joint and a female pipe joint which are detachably coupled to each other. The male pipe joint includes a cylindrical male joint body defining a male flow path, and an engaging projection projecting radially outward from the male joint body. The female pipe joint includes a cylindrical female joint body defining a female flow path, a cylindrical rotary coupling member circumferentially rotatably disposed around an outer peripheral surface of the female joint body and configured to at least partially receive the male joint body. The rotary coupling member has a guide portion extending to project circumferentially at a forward end portion of the rotary coupling member. The guide portion has an engaging surface facing toward a rear end portion of the rotary coupling member. The female pipe joint further includes a movable locking member disposed to the rotary coupling member so as to be displaceable between a lock position and an unlock position. The pipe joint assembly is configured such that, with the movable locking member placed in the unlock position, when the male joint body is inserted into the rotary coupling member to a predetermined position and then the rotary coupling member is rotated in a first rotational direction to a predetermined coupling position, the engaging projection engages the engaging surface so that the male joint body and the female joint body are sealingly engaged with each other to achieve a coupled state. The pipe joint assembly is further configured such that, with the movable locking member displaced to the lock position in the coupled state, when the rotary coupling member is rotated in a second rotational direction opposite to the first rotational direction toward an uncoupling position where the engaging surface and the engaging projection are out of engagement with each other, the movable locking member engages the engaging projection to inhibit the rotary coupling member from rotating to the uncoupling position.

The pipe joint assembly is configured such that the rotary coupling member can be inhibited from rotating to the uncoupling position by displacing the movable locking member to the lock position in the coupled state. Therefore, it is possible to inhibit the rotary coupling member from unexpectedly rotating to the uncoupling position, which would otherwise uncouple the male and female pipe joints. Consequently, the pipe joint assembly need not provide a large recess as is typically understood as being required in conventional pipe assemblies for inhibiting accidental rotation of the rotary coupling member.

Further, the movable locking member may be pivotable between the unlock position and the lock position outside the rotary coupling member such that, in the unlock position, the movable locking member extends radially outward from the outer peripheral surface of the rotary coupling member to function as a handle for a user to grip to rotate the rotary coupling member, and in the lock position, the movable locking member extends along the outer peripheral surface of the rotary coupling member.

Because the movable locking member also functions as a handle in the unlock position, the rotary coupling member can be rotated easily without providing a handle separately. In addition, because the movable locking member, when placed in the lock position, extends along the outer peripheral surface of the rotary coupling member, it is possible to reduce the radial size of the pipe joint assembly.

Further, the pipe joint assembly may further include a retaining member disposed on the outer peripheral surface of the rotary coupling member to pivotably retain the movable locking member, and a sleeve disposed so as to be displaceable along the movable locking member. The sleeve may be displaceable between a pivot-permitting position where the sleeve is out of engagement with the retaining member in a pivoting direction of the movable locking member, and a pivot-inhibiting position where the sleeve is in engagement with the retaining member in the pivoting direction to inhibit pivoting of the movable locking member.

More specifically, the sleeve may have a protrusion protruding outward, and the retaining member may have a first receiving portion configured to receive and engages the protrusion in the pivoting direction when the sleeve is displaced to the pivot-inhibiting position in a state where the movable locking member is in the unlock position, and a second receiving portion configured to receive and engage the protrusion in the pivoting direction when the sleeve is displaced to the pivot-inhibiting position in a state where the movable locking member is in the lock position.

With the above-described arrangement, the movable locking member can be held in the unlock position, and it is therefore possible to inhibit the movable locking member from rotating unexpectedly when used as a handle. In addition, because the movable locking member can be held in the lock position, accidental rotation of the rotary coupling member can be inhibited even more reliably.

Further, the pipe joint assembly may further include a spring urging the sleeve toward the pivot-inhibiting position.

Further, the engaging surface may have an inclined engaging surface extending in the second rotational direction while being inclined toward the rear end portion, so that when the male joint body is inserted into the rotary coupling member to the predetermined position and then the rotary coupling member is rotated in the first rotational direction toward the coupling position, the inclined engaging surface slidingly engages the engaging projection to press the engaging projection toward the rear end portion, thereby permitting the male joint body to be brought into the rotary coupling member and thus permitting the male joint body to be sealingly engaged with the female joint body.

Further, the engaging surface may further have a parallel engaging surface extending continuously from the inclined engaging surface in parallel to the rotational direction of the rotary coupling member, so that the engaging projection is engaged with the parallel engaging surface when the rotary coupling member is in the coupling position.

Further, the arrangement may be as follows. The male joint body has an inclined forward end face inclined in one of radially inward and radially outward directions toward the forward side of the male joint body, and the female joint body has an inclined forward end face inclined in the other of the radially inward and radially outward directions toward the forward side of the female joint body. At least one of the inclined forward end face of the male joint body and the inclined forward end face of the female joint body has a seal member disposed thereon. In the coupled state, the inclined forward end face of the male joint body and the inclined forward end face of the female joint body are in contact with or in close proximity to each other to press the seal member between the inclined forward end face of the male joint body and the inclined forward end face of the female joint body.

DRAWINGS

Forms of a pipe joint assembly according to the present disclosure will be explained below based on the accompanying drawings.

Figure 1:
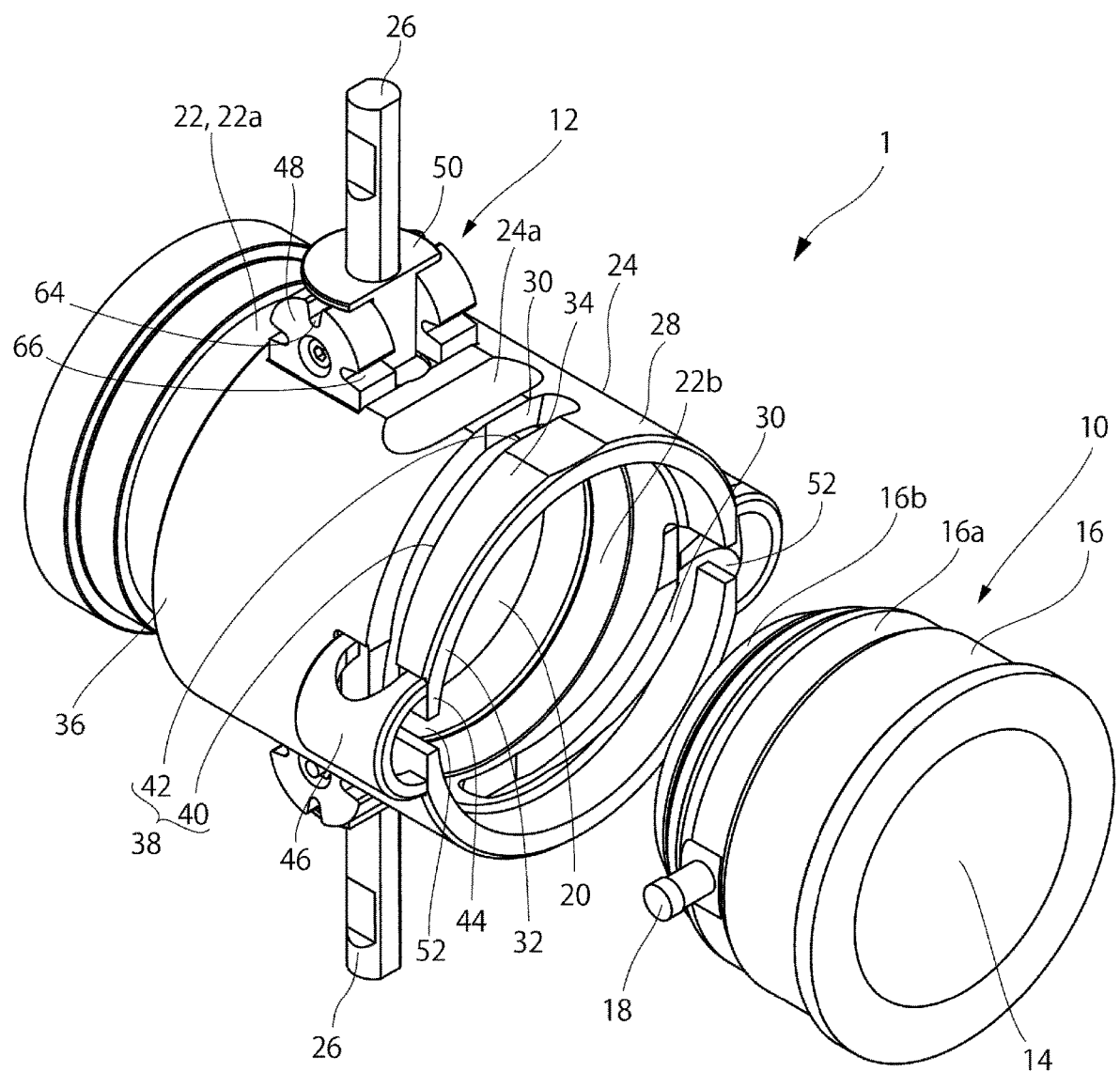
FIG. 1 is a perspective view of a pipe joint assembly according to a form of the present disclosure, illustrated in an uncoupled state.
Figure 6:
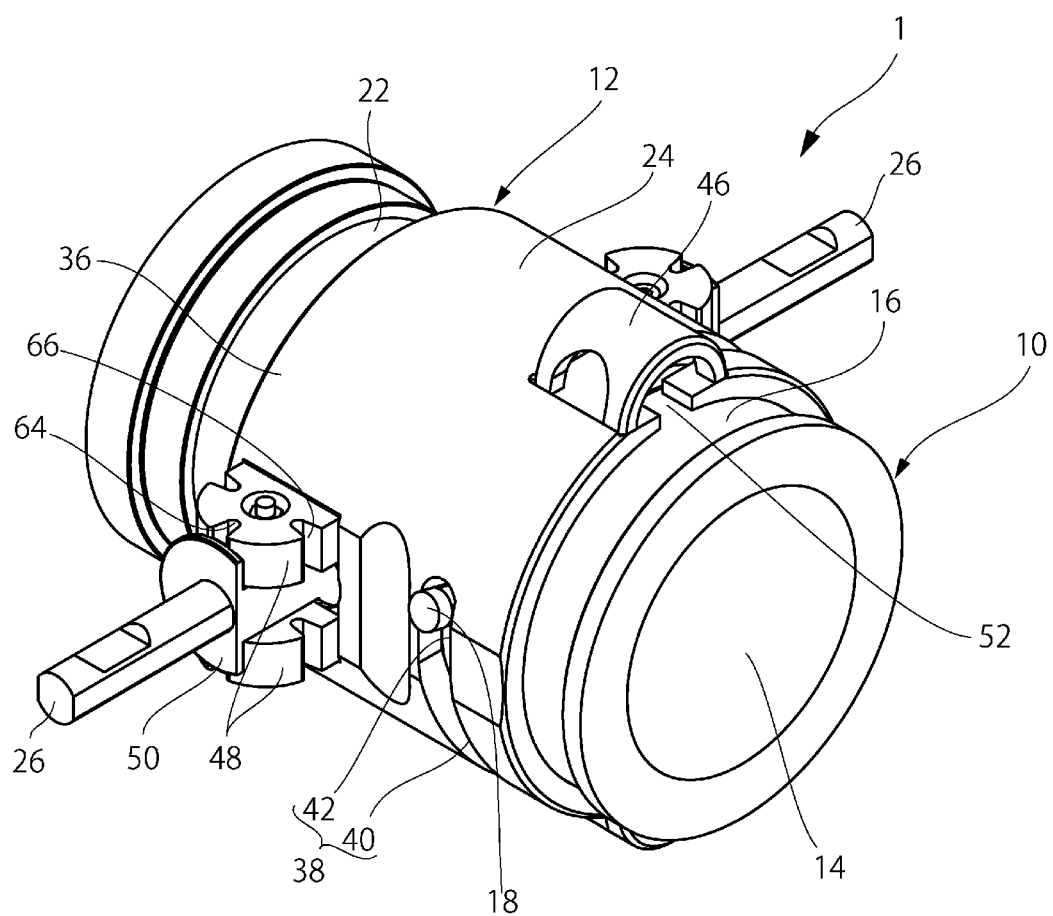
FIG. 6 is a perspective view of the pipe joint assembly of FIG. 1, illustrated in a state where a rotary coupling member has been rotated from the position shown in FIG. 3 to a coupling position, according to the present disclosure.
Figure 11:
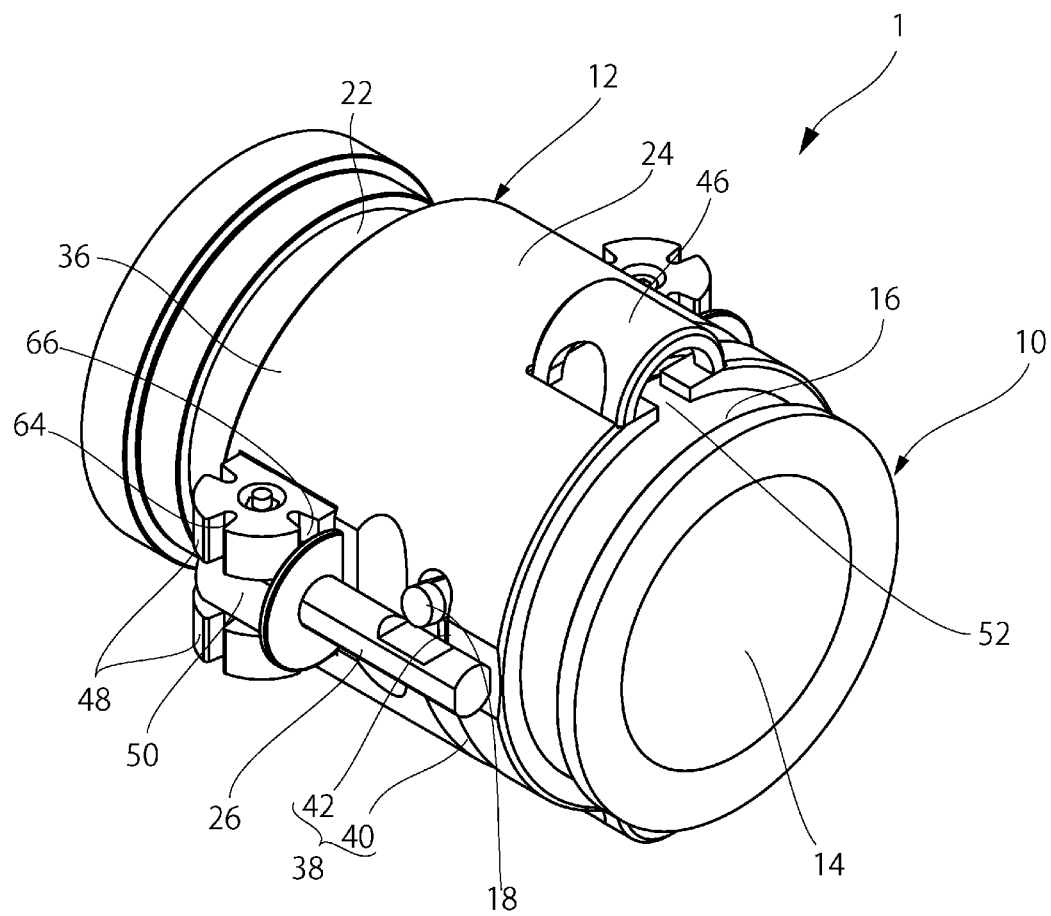
Figure 12:
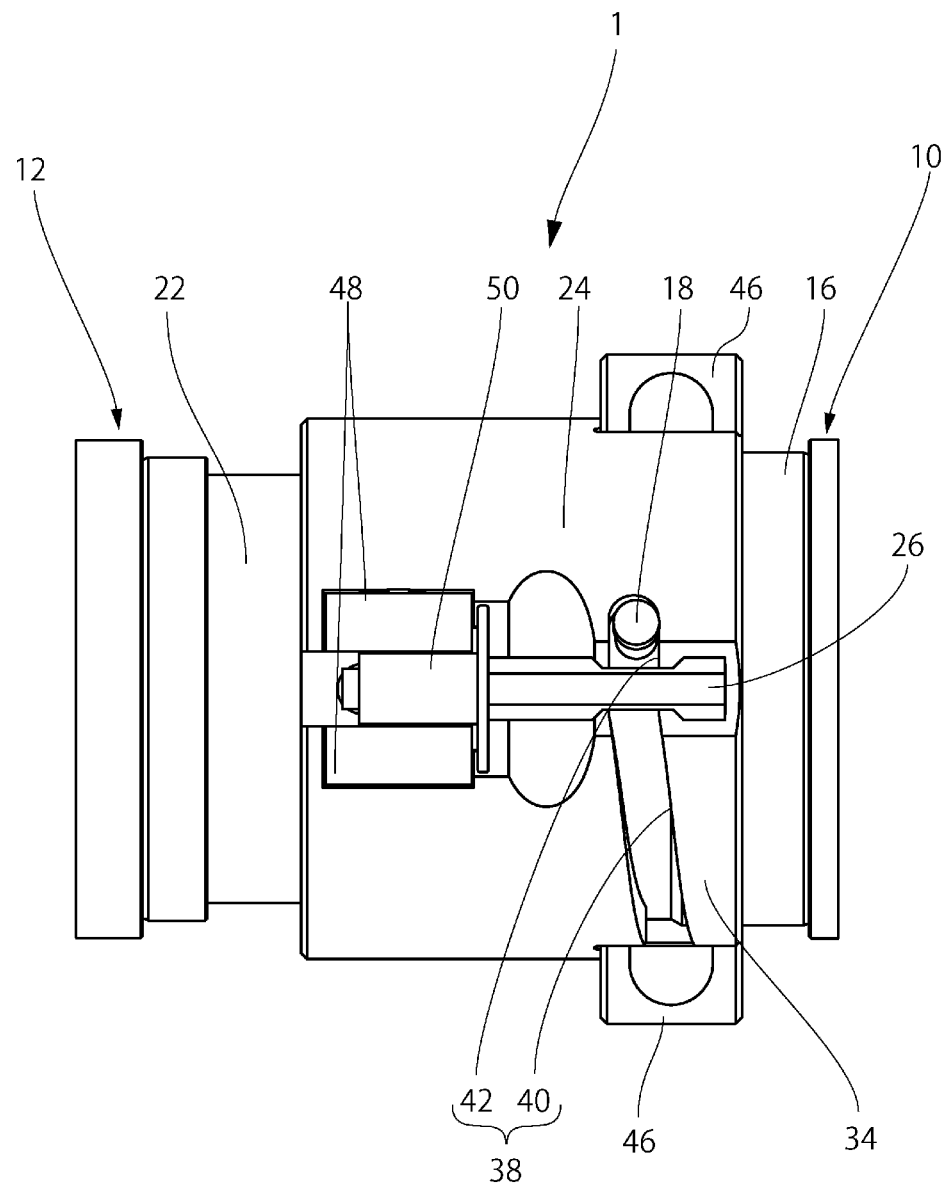

FIG. 11 is a perspective view of the pipe joint assembly of FIG. 1, illustrated in a state where a movable locking member has been pivoted from the position shown in FIG. 6 to a lock position, according to the present disclosure; and FIG. 12 is a side view of the pipe joint assembly of FIG. 1, illustrated in a state where the movable locking member has been pivoted from the position shown in FIG. 6 to the lock position, according to the present disclosure.

DETAILED DESCRIPTION

Figure 2:
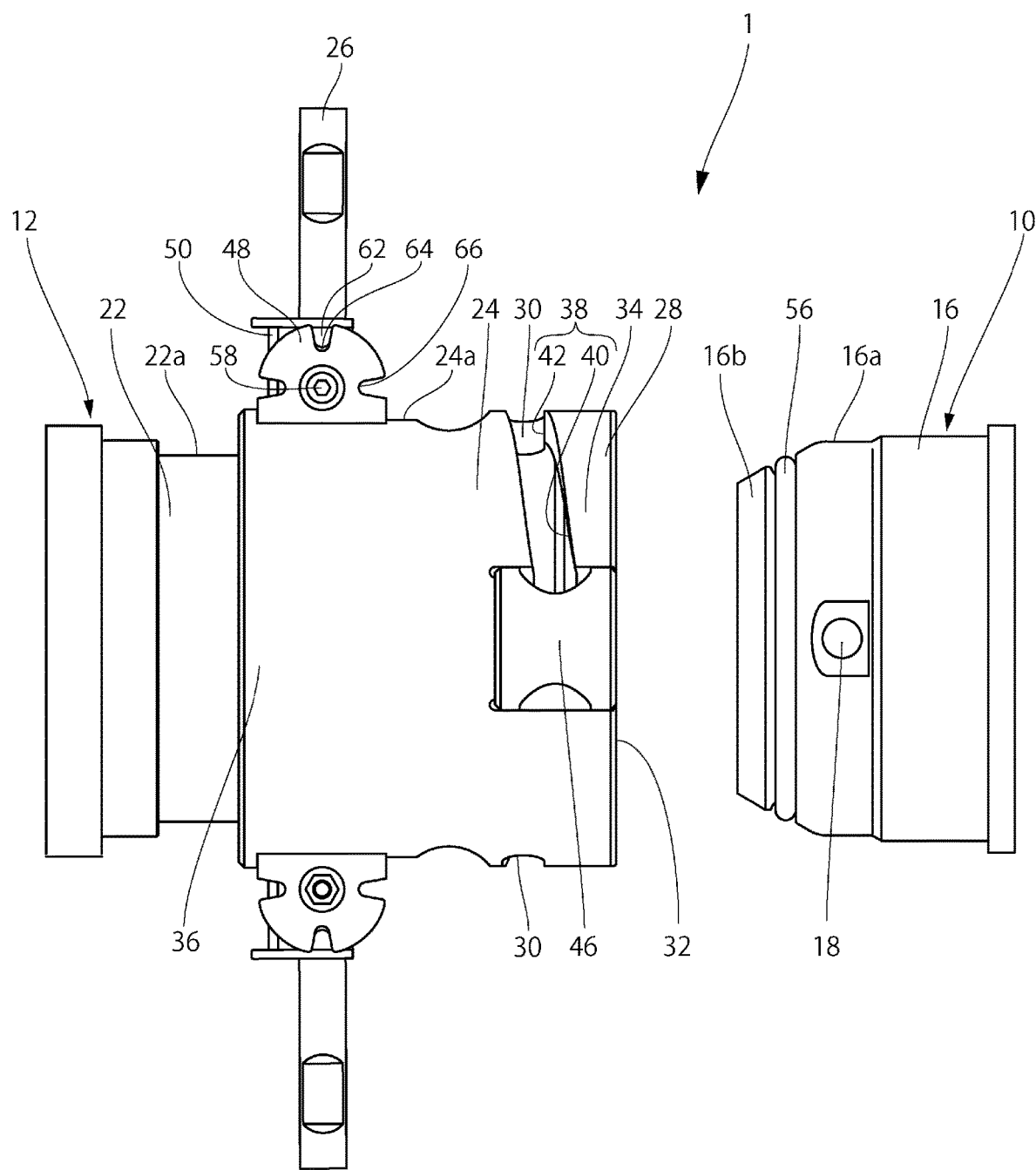
FIG. 2 is a side view of the pipe joint assembly of FIG. 1.

As shown in FIGS. 1 and 2, a pipe joint assembly 1 according to a form of the present disclosure comprises a male pipe joint 10 and a female pipe joint 12 which are detachably coupled to each other.

The male pipe joint 10 includes a cylindrical male joint body 16 defining a male flow path 14, and an engaging projection 18 attached to an outer peripheral surface 16a of the male joint body 16 so as to project radially outward from the male joint body 16. In FIGS. 1 and 2, only one engaging projection 18 is seen, but another engaging projection 18 is also provided on the side opposite to the illustrated engaging projection 18. In this form, the engaging projections 18 are welded to the male joint body 16.

The female pipe joint 12 includes a cylindrical female joint body 22 defining a female flow path 20, a cylindrical rotary coupling member 24 circumferentially rotatably disposed around an outer peripheral surface 22a of the female joint body 22, and movable locking members 26 pivotably attached to the rotary coupling member 24. The rotary coupling member 24 has two cut portions 30 formed in a forward end portion 28 thereof. Each cut portion 30 first extends rearward from a forward end face 32 and then helically extends in the circumferential direction. The cut portion 30 forms a guide portion 34 extending to project circumferentially at the forward end portion 28. The guide portion 34 has an engaging surface 38 facing toward a rear end portion 36 of the rotary coupling member 24. The engaging surface 38 comprises an inclined engaging surface 40 extending circumferentially from a distal end 44 of the guide portion 34 while being inclined toward the rear end portion 36, and a parallel engaging surface 42 extending continuously from the inclined engaging surface 40 in parallel to the rotational direction of the rotary coupling member 24. The rotary coupling member 24 has a reinforcing member 46 attached to an outer peripheral surface 24a thereof to connect together the distal end 44 of the guide portion 34 and a peripheral portion of the rotary coupling member 24 that faces the distal end 44 across the cut portion 30. The reinforcing member 46 reinforces the guide portion 34 so as to inhibit bending of the elongated guide portion 34. The movable locking members 26 are rod-shaped elongated members. In an unlock position shown in FIGS. 1 and 2, the movable locking members 26 extend radially outward from the outer peripheral surface 24a of the rotary coupling member 24. Each movable locking member 26 is retained by retaining members 48 disposed at both sides thereof so that the movable locking member 26 is pivotable forwardly from the unlock position shown in the figures. A sleeve 50 is disposed between the movable locking member 26 and the retaining members 48 in such a manner as to cover the movable locking member 26.

Figure 3:
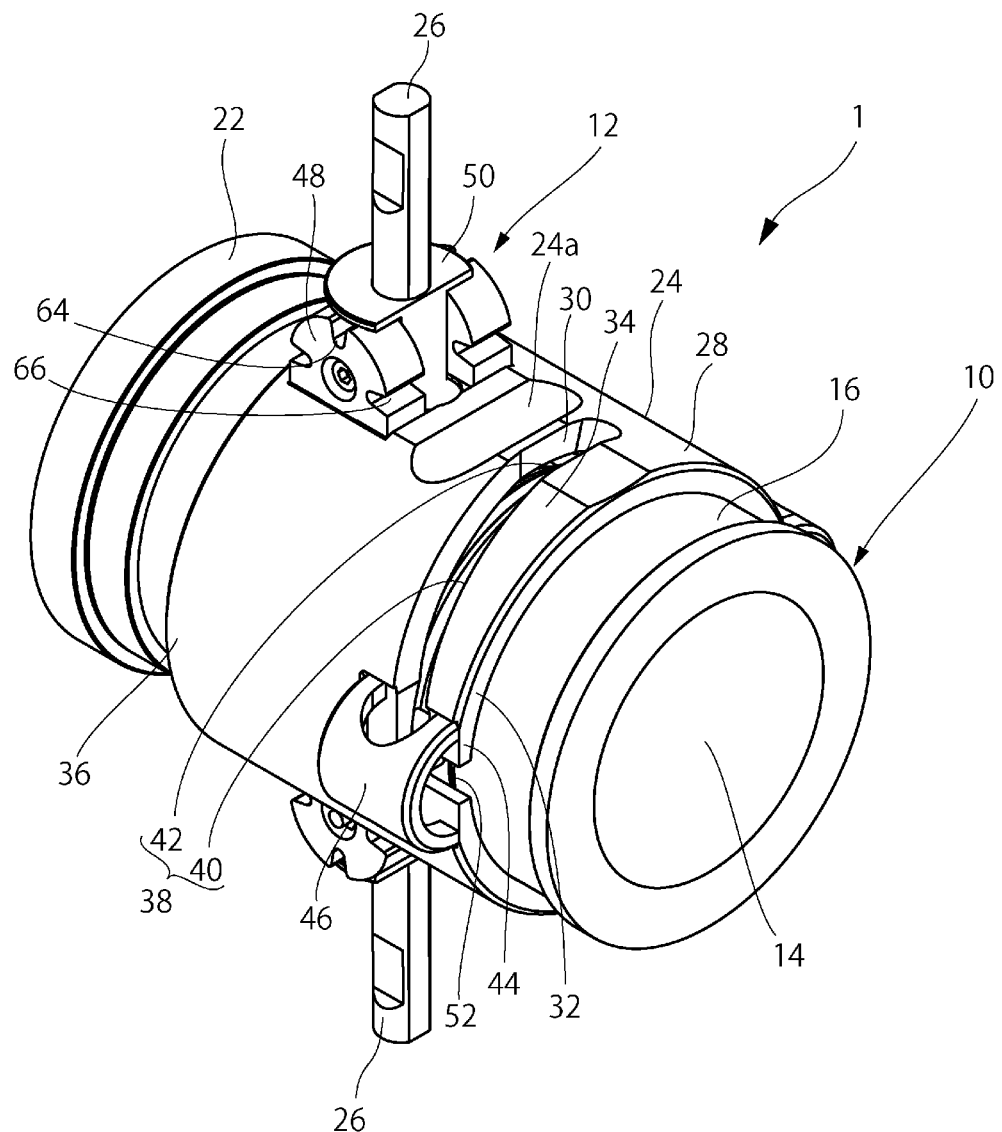
FIG. 3 is a perspective view of the pipe joint assembly of FIG. 1, illustrated in a state where a male pipe joint has been inserted in a female pipe joint to a predetermined position, according to the present disclosure.
Figure 4:
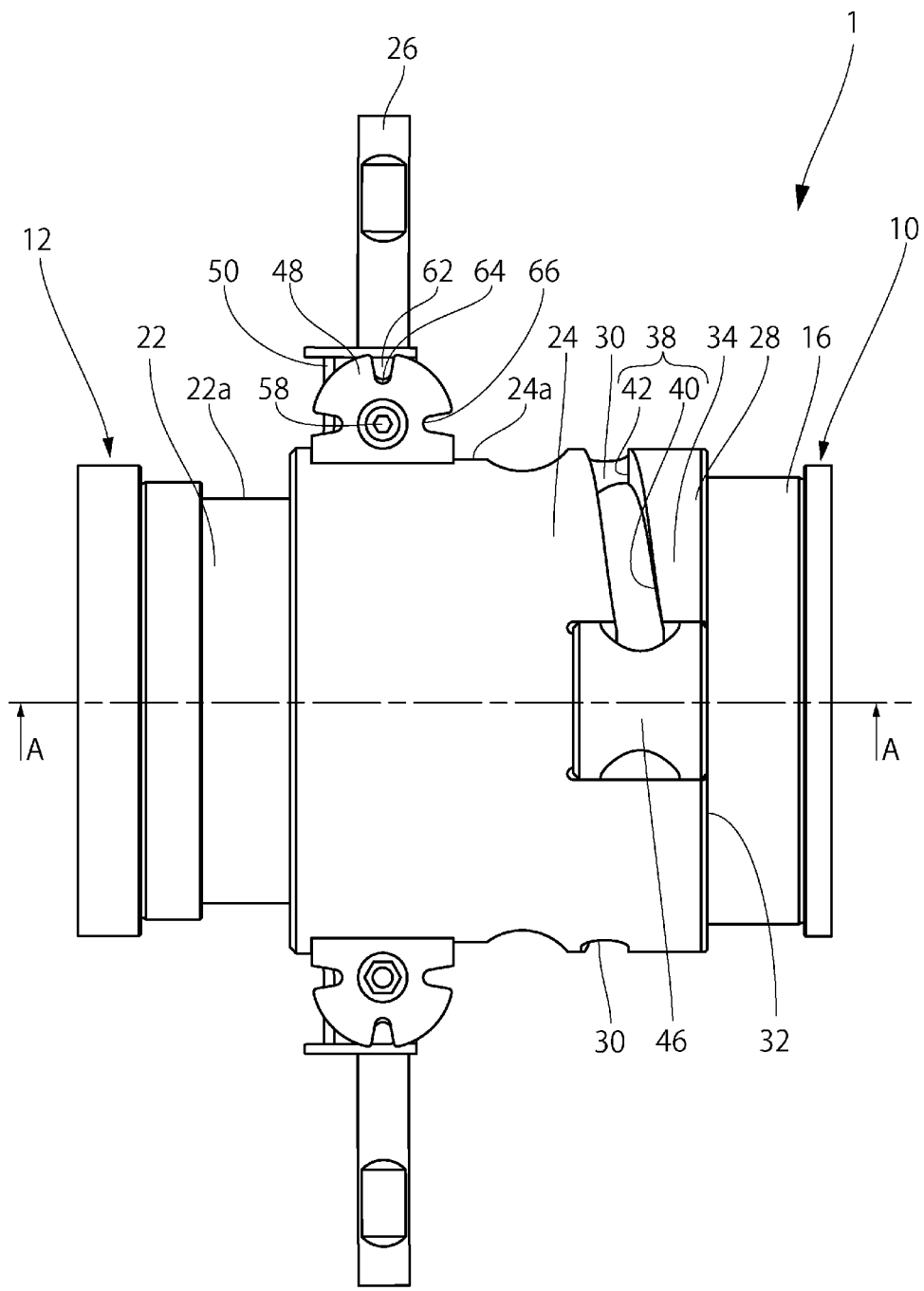
FIG. 4 is a side view of the pipe joint assembly of FIG. 1, showing the pipe joint assembly in a state where the male pipe joint has been inserted in the female pipe joint to the predetermined position, according to the present disclosure.
Figure 5:
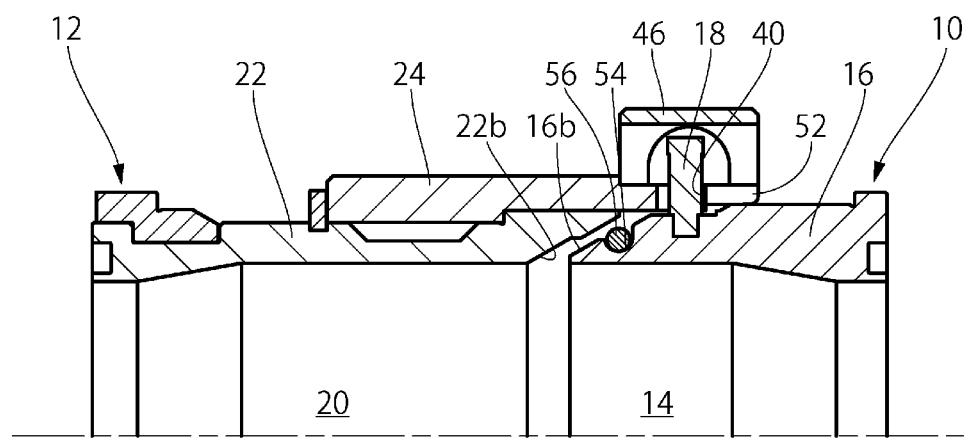
FIG. 5 is a sectional view of a portion of the pipe joint assembly of FIG. 1, taken along the line A-A shown in FIG. 4.

To couple the male pipe joint 10 and the female pipe joint 12, as shown in FIGS. 1 and 2, the male and female pipe joints 10 and 12 are positioned relative to each other such that the engaging projections 18 of the male pipe joint 10 are respectively aligned with distal end openings 52 of the cut portions 30 of the female pipe joint 12. With this positional relationship, as shown in FIGS. 3 and 4, a part of the male joint body 16 of the male pipe joint 10 is inserted into the rotary coupling member 24 of the female pipe joint 12 to a predetermined position. At this time, the engaging projections 18 of the male pipe joint 10 are inserted into the cut portions 30, respectively, of the female pipe joint 12. In this state, as shown in FIG. 5, a forward end face 16b of the male joint body 16 and a forward end face 22b of the female joint body 22 are not in contact with each other. The forward end face 16b of the male joint body 16 is an inclined forward end face 16b that is inclined radially inward toward the forward side of the male joint body 16 (leftward as seen in the figure), and the forward end face 22b of the female joint body 22 is an inclined forward end face 22b that is inclined radially outward toward the forward side of the female joint body 22 (rightward as seen in the figure). In addition, the male joint body 16 has a circumferential groove 54 formed in the inclined forward end face 16b, and a seal member 56 is installed in the circumferential groove 54.

Figure 7:
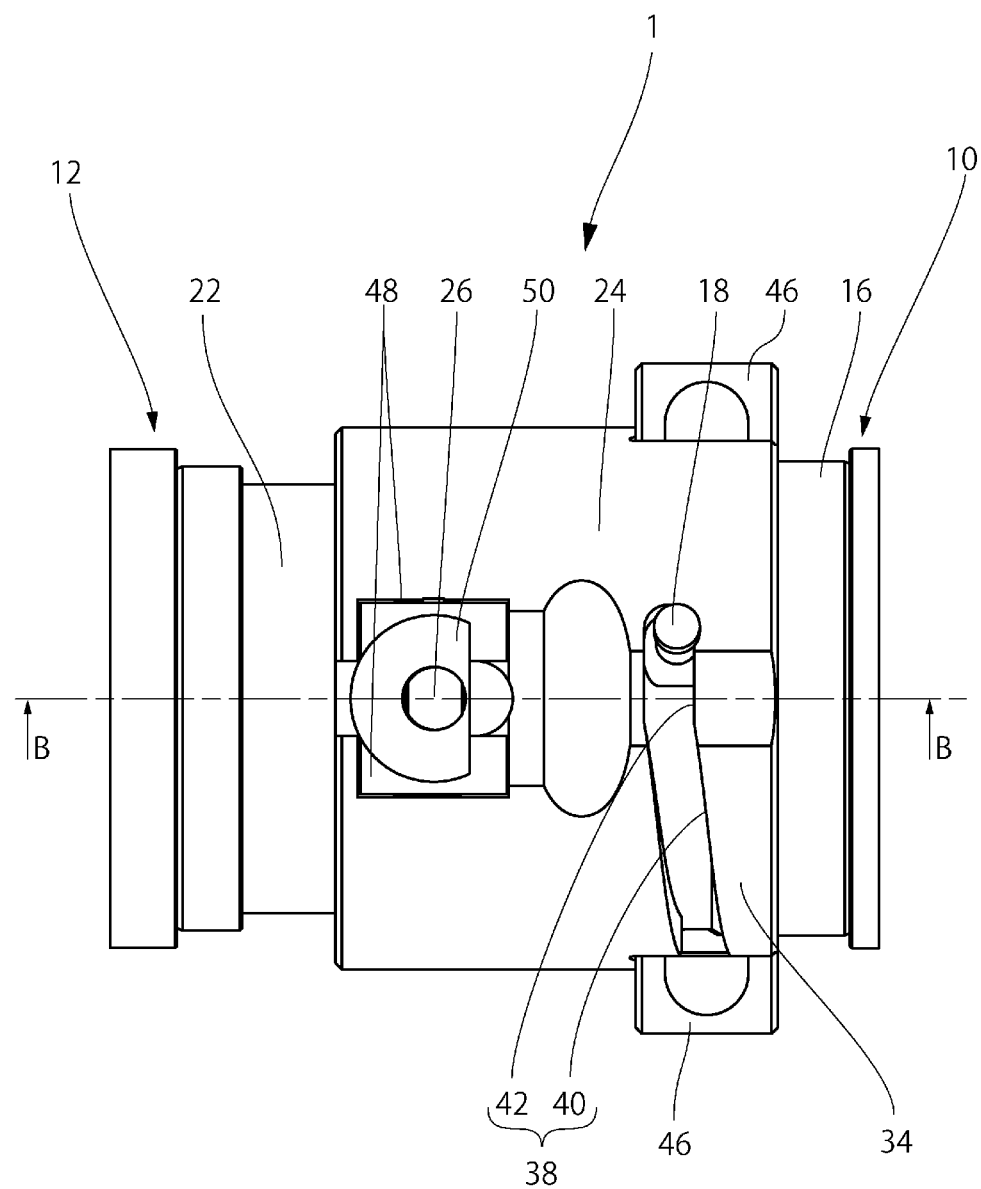
FIG. 7 is a side view of the pipe joint assembly of FIG. 1, illustrated in a state where the rotary coupling member has been rotated from the position shown in FIG. 3 to the coupling position, according to the present disclosure.
Figure 8:
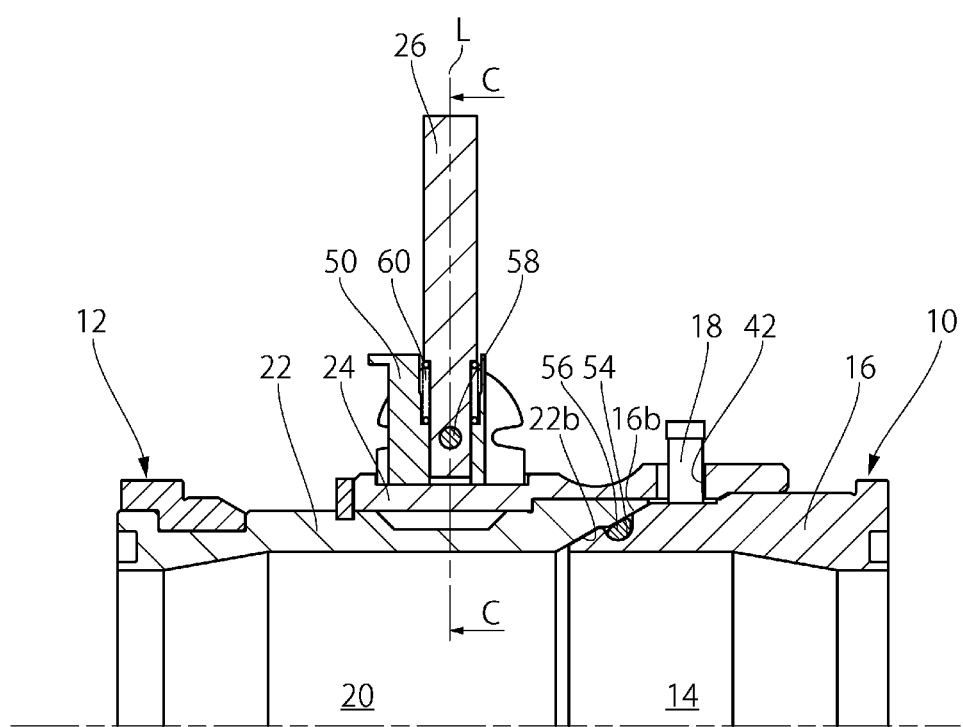
FIG. 8 is a sectional view of a portion of the pipe joint assembly of FIG. 1, taken along the line B-B shown in FIG. 7.

Next, as shown in FIGS. 6 and 7, the rotary coupling member 24 is rotated through approximately 90 degrees in the counterclockwise direction (first rotational direction) as seen from the front side of the rotary coupling member 24 (right side as seen in the figures). As the rotary coupling member 24 rotates, each engaging projection 18 slidingly engages the inclined engaging surface 40 of the associated guide portion 34 and is pushed toward the rear end portion 36 of the rotary coupling member 24 along the inclined engaging surface 40. Consequently, the male joint body 16 is brought into the rotary coupling member 24. When the rotary coupling member 24 reaches a coupling position shown in FIGS. 6 and 7, the engaging projection 18 is engaged with the parallel engaging surface 42 of the guide portion 34. In the coupled state, as shown in FIG. 8, the inclined forward end face 16b of the male joint body 16 and the inclined forward end face 22b of the female joint body 22 are in contact with or in close proximity to each other, so that the seal member 56 attached to the inclined forward end face 16b of the male joint body 16 is pressed between the inclined forward end face 16b and the inclined forward end face 22b of the female joint body 22. Thus, the inclined forward end face 16b of the male joint body 16 and the inclined forward end face 22b of the female joint body 22 are sealingly engaged with each other. Consequently, the male flow path 14 and the female flow path 20 are fluid-communicated with each other in a sealed condition. The pipe joint assembly 1 is configured to permit the rotary coupling member 24 to be rotated easily by gripping the movable locking members 26, which elongatedly extend radially outward. In other words, the movable locking members 26 in this form are configured to also function as handles.

Figure 9:
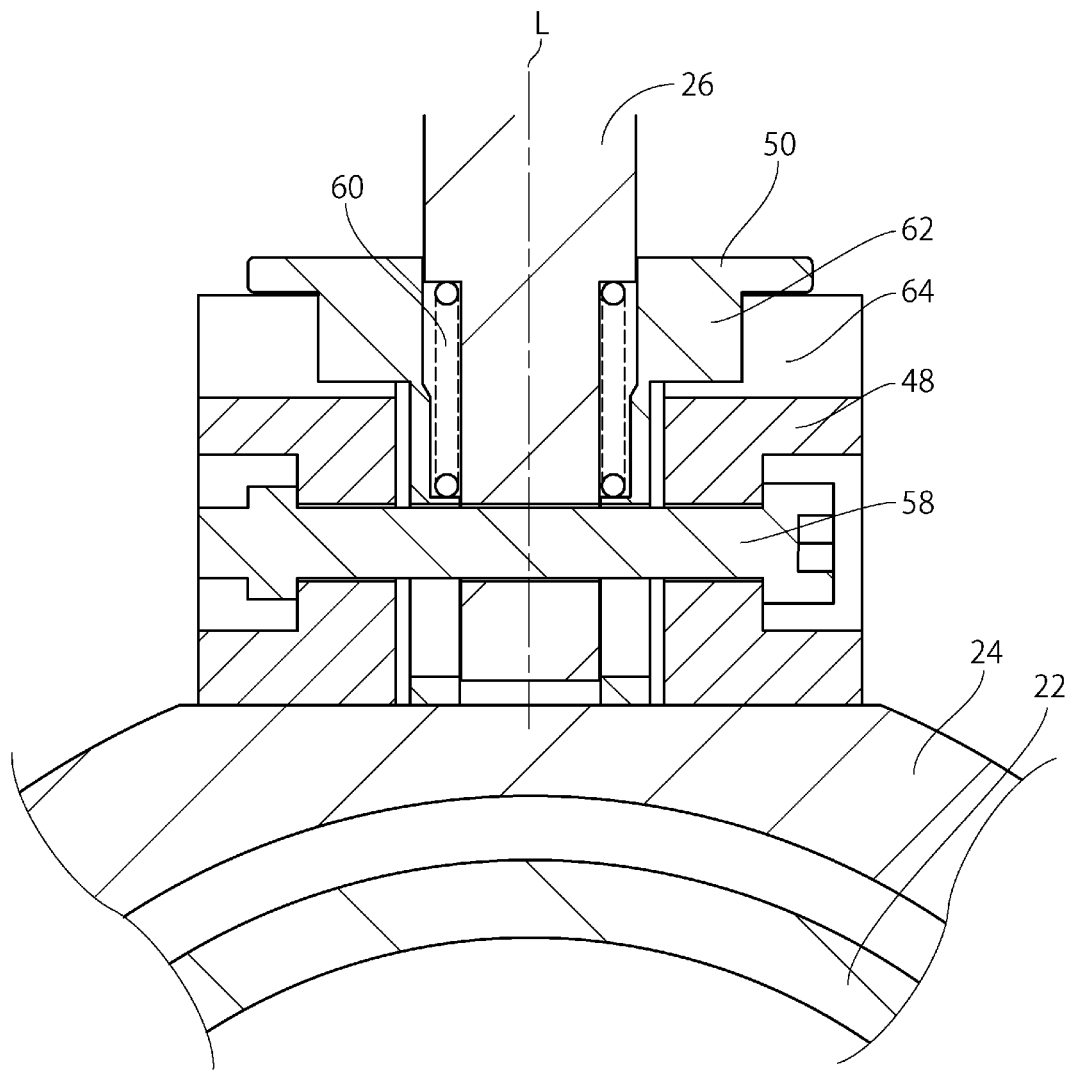
FIG. 9 is a sectional view of a portion of the pipe joint assembly of FIG. 1, taken along the line C-C shown in FIG. 8, illustrating the pipe joint assembly in a state where a sleeve is in a pivot-inhibiting position, according to the present disclosure.
Figure 10:
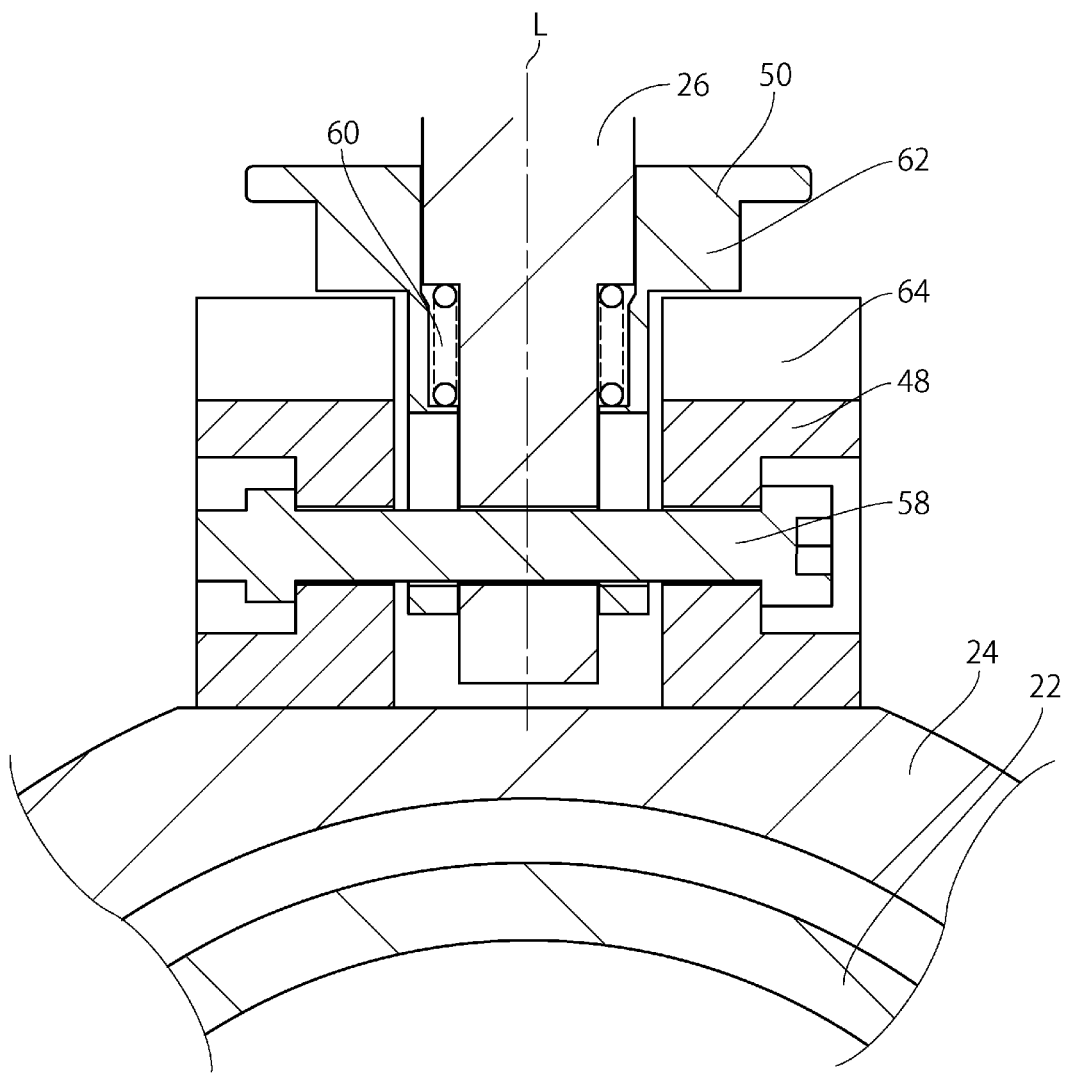
FIG. 10 is a sectional view of a portion of the pipe joint assembly of FIG. 1, taken along the line C-C shown in FIG. 8, illustrating the pipe joint assembly in a state where the sleeve has been displaced to a pivot-permitting position, according to the present disclosure.

As shown in FIGS. 8 to 10, each movable locking member 26 is pivotably attached to the retaining members 48 through a pivot shaft 58, and the sleeve 50 is disposed between the movable locking member 26 and the retaining members 48. The sleeve 50 is attached to the movable locking member 26 so as to be displaceable in the direction of a longitudinal axis L of the movable locking member 26 and urged toward the rotary coupling member 24 by a spring 60 disposed between the sleeve 50 and the movable locking member 26. As shown in FIG. 9, the sleeve 50 has a protrusion 62 provided on a side face thereof. The protrusion 62 is received and engaged in first receiving portions 64 provided in the retaining members 48 when the sleeve 50 is in a pivot-inhibiting position shown in the figure. Thus, the sleeve 50 is locked relative to the retaining members 48 in the pivoting direction of the movable locking member 26, and consequently, the movable locking member 26, which extends through the sleeve 50, is also locked and inhibited from pivoting. The movable locking member 26 is locked in this way, and it is possible to inhibit the movable locking member 26 from unexpectedly pivoting when used as a handle. If the sleeve 50 is displaced from the pivot-inhibiting position shown in FIG. 9 to a pivot-permitting position shown in FIG. 10 against the urging force of the spring 60, the protrusion 62 comes out of the first receiving portions 64. Thus, the lock of the sleeve 50 to the retaining members 48 in the pivoting direction is released, and consequently, the movable locking member 26 becomes pivotable relative to the rotary coupling member 24 and the retaining members 48.

With the sleeve 50 displaced to the pivot-permitting position as described above, the movable locking member 26 is pivoted forwardly from the position shown in FIGS. 6 and 7 and thus displaced to a lock position shown in FIGS. 11 and 12. Consequently, the protrusion 62 of the sleeve 50 is located in alignment with second receiving portions 66 of the retaining members 48, and the sleeve 50 is placed in the pivot-inhibiting position again by the urging force of the spring 60. At this time, the protrusion 62 of the sleeve 50 is engaged with the second receiving portions 66, which are provided on the forward side of the retaining members 48, so that the movable locking member 26 is locked in the lock position shown in the figures. When in the lock position, the movable locking member 26 is adjacent to or in contact with the engaging projection 18 of the male pipe joint 10, i.e., located where the movable locking member 26 interferes with the engaging projection 18 in the direction of rotation thereof. Therefore, if the rotary coupling member 24 is rotated in the clockwise direction (second rotational direction) from the illustrated lock position toward the uncoupling position shown in FIGS. 6 and 7, the movable locking member 26 engages the engaging projection 18. Accordingly, the rotary coupling member 24 cannot rotate any more and hence can be inhibited from rotating to the uncoupling position.

Thus, the pipe joint assembly 1 in the above-described form makes it possible to inhibit the rotary coupling member 24 from unexpectedly rotating to the uncoupling position in the coupled state by placing the movable locking member 26 in the lock position. In addition, because the rotary coupling member 24 is held in the coupling position by the movable locking member 26, accidental rotation of the rotary coupling member 24 can be inhibited without providing a recess in the engaging surface 38 to be engaged with the engaging projection 18, which has been generally understood as being required in conventional pipe joint assemblies. Accordingly, the male pipe joint 10 can be coupled to the female pipe joint 12 by being displaced only in the insertion direction all the way to achieve the coupled state, without pulling back away from the female pipe joint 12. Thus, the seal member 56 can be placed in an appropriate compressed state without being compressed excessively, and it is therefore possible to perform the coupling operation without the need for a large force and without applying an excessive load to the seal member 56. Further, in the foregoing form, the movable locking members 26 can be used as handles to rotate the rotary coupling member 24. Accordingly, the operation of rotating the rotary coupling member 24 can be performed even more easily. In particular, when the flow path diameter increases and the pipe joint assembly 1 becomes large in size as a whole, the force needed to rotate the rotary coupling member 24 tends to increase. Even in such a case, the rotary coupling member 24 can be rotated easily by using the movable locking members 26 as handles. In addition, when the pipe joint assembly 1 is in the coupled state, the movable locking members 26 used as handles are placed in the lock position, where the movable locking members 26 extend along the outer peripheral surface 24a of the rotary coupling member 24. Therefore, it is possible to suppress an increase in radial size of the pipe joint assembly 1 when in the coupled state and hence possible to inhibit the pipe joint assembly 1 from interfering with the surroundings when in the coupled state.

Although some forms of the present disclosure have been explained above, the present disclosure is not limited to these forms. For example, the movable locking member need not necessarily be configured to function as a handle in the unlock position, and, in another form, another handle can be included. Further, the movable locking member may be displaced between the unlock position and the lock position in other forms such as pivoting or rotation in another direction, or translation. For example, the movable locking member may be configured to be linearly displaceable in the longitudinal direction along the outer peripheral surface of the rotary coupling member so that the movable locking member is displaced between an unlock position where the movable locking member does not interfere with the engaging projection and a lock position where the former interferes with the latter. In addition, the number of engaging projections and the number of engaging surfaces engageable with the projections may be changed as desired. That is, these numbers may be only one, or three or more. Further, the seal member may be provided on the inclined forward end face of the female joint body. The inclination direction of the inclined forward end face of the male joint body and that of the inclined forward end face of the female joint body may be inverted with respect to each other. These forward end faces may be non-inclined surfaces. It should be noted that although the present disclosure eliminates the need to provide a rotation-inhibiting recess in the engaging surface, which has been generally understood as being required in conventional pipe joint assemblies, such a recess may be provided supplementally.

What is claimed is:

1. A pipe joint assembly comprising:
   a male pipe joint including:
      a cylindrical male joint body defining a male flow path; and
      an engaging projection projecting radially outward from the male joint body; and
   a female pipe joint configured to be detachably coupled to the male pipe joint, the female pipe joint including:
      a cylindrical female joint body defining a female flow path;
      a cylindrical rotary coupling member circumferentially rotatably disposed around an outer peripheral surface of the female joint body and configured to at least partially receive the male joint body, wherein the rotary coupling member has a guide portion extending so as to project circumferentially at a forward end portion of the rotary coupling member, wherein the guide portion has an engaging surface facing toward a rear end portion of the rotary coupling member;
      a movable locking member disposed to the rotary coupling member so as to be displaceable between a lock position and an unlock position, the movable locking member pivotable between the unlock position and the lock position outside the rotary coupling member such that, in the unlock position, the movable locking member extends radially outward from an outer peripheral surface of the rotary coupling member to function as a handle for a user to grip to rotate the rotary coupling member, and in the lock position, the movable locking member extends along the outer peripheral surface of the rotary coupling member; and
      a retaining member disposed on the outer peripheral surface of the rotary coupling member to pivotably retain the movable locking member, and a sleeve disposed so as to be displaceable along the movable locking member, the sleeve displaceable between a pivot-permitting position where the sleeve is out of engagement with the retaining member in a pivoting direction of the movable locking member, and a pivot-inhibiting position where the sleeve is in engagement with the retaining member in the pivoting direction to inhibit pivoting of the movable locking member, wherein the pipe joint assembly is configured such that, with the movable locking member placed in the unlock position, when the male joint body is inserted into the rotary coupling member to a predetermined position and then the rotary coupling member is rotated in a first rotational direction to a predetermined coupling position, the engaging projection engages the engaging surface so that the male joint body and the female joint body are sealingly engaged with each other to achieve a coupled state, and wherein the pipe joint assembly is further configured such that, with the movable locking member displaced to the lock position in the coupled state, when the rotary coupling member is rotated in a second rotational direction opposite to the first rotational direction toward an uncoupling position where the engaging surface and the engaging projection are out of engagement with each other, the movable locking member engages the engaging projection to inhibit the rotary coupling member from rotating to the uncoupling position.

2. The pipe joint assembly of claim 1, wherein the sleeve has a protrusion protruding outward; and wherein the retaining member has:
  a first receiving portion configured to receive and engage the protrusion in the pivoting direction when the sleeve is displaced to the pivot-inhibiting position in a state where the movable locking member is in the unlock position; and
  a second receiving portion configured to receive and engage the protrusion in the pivoting direction when the sleeve is displaced to the pivot-inhibiting position in a state where the movable locking member is in the lock position.

3. The pipe joint assembly of claim 1, further including a spring urging the sleeve toward the pivot-inhibiting position.

4. The pipe joint assembly of claim 1, wherein the engaging surface has an inclined engaging surface extending in the second rotational direction while being inclined toward the rear end portion, so that insertion of the male joint body is into the rotary coupling member to the predetermined position and then rotating the rotary coupling member in the first rotational direction toward the coupling position slidingly engages the inclined engaging surface the engaging projection to press the engaging projection toward the rear end portion, thereby permitting the male joint body to be brought into the rotary coupling member and thus permitting the male joint body to be sealingly engaged with the female joint body.

5. The pipe joint assembly of claim 4, wherein the engaging surface further has a parallel engaging surface extending continuously from the inclined engaging surface in parallel to the rotational direction of the rotary coupling member, so that the engaging projection is engaged with the parallel engaging surface when the rotary coupling member is in the coupling position.

6. A pipe joint assembly comprising:
a male pipe joint including:
  a cylindrical male joint body defining a male flow path; and
  an engaging projection projecting radially outward from the male joint body; and
a female pipe joint configured to be detachably coupled to the male pipe joint, the female pipe joint including:
  a cylindrical female joint body defining a female flow path;
  a cylindrical rotary coupling member circumferentially rotatably disposed around an outer peripheral surface of the female joint body and configured to at least partially receive the male joint body, wherein the rotary coupling member has a guide portion extending so as to project circumferentially at a forward end portion of the rotary coupling member, wherein the guide portion has an engaging surface facing toward a rear end portion of the rotary coupling member; and
  a movable locking member disposed to the rotary coupling member so as to be displaceable between a lock position and an unlock position,
wherein the pipe joint assembly is configured such that, with the movable locking member placed in the unlock position, when the male joint body is inserted into the rotary coupling member to a predetermined position and then the rotary coupling member is rotated in a first rotational direction to a predetermined coupling position, the engaging projection engages the engaging surface so that the male joint body and the female joint body are sealingly engaged with each other to achieve a coupled state,
wherein the pipe joint assembly is further configured such that, with the movable locking member displaced to the lock position in the coupled state, when the rotary coupling member is rotated in a second rotational direction opposite to the first rotational direction toward an uncoupling position where the engaging surface and the engaging projection are out of engagement with each other, the movable locking member engages the engaging projection to inhibit the rotary coupling member from rotating to the uncoupling position,
wherein the male joint body has an inclined forward end face inclined in one of radially inward and radially outward directions toward a forward side of the male joint body, and the female joint body has an inclined forward end face inclined in the other of the radially inward and radially outward directions toward a forward side of the female joint body, at least one of the inclined forward end face of the male joint body and the inclined forward end face of the female joint body having a seal member disposed thereon, and
wherein, in the coupled state, the inclined forward end face of the male joint body and the inclined forward end face of the female joint body are in contact with or in close proximity to each other to press the seal member between the inclined forward end face of the male joint body and the inclined forward end face of the female joint body.

* * * * *